Feb. 9, 1937.  F. E. RICE  2,070,068
REGULATOR MECHANISM
Filed Sept. 18, 1935  2 Sheets-Sheet 1
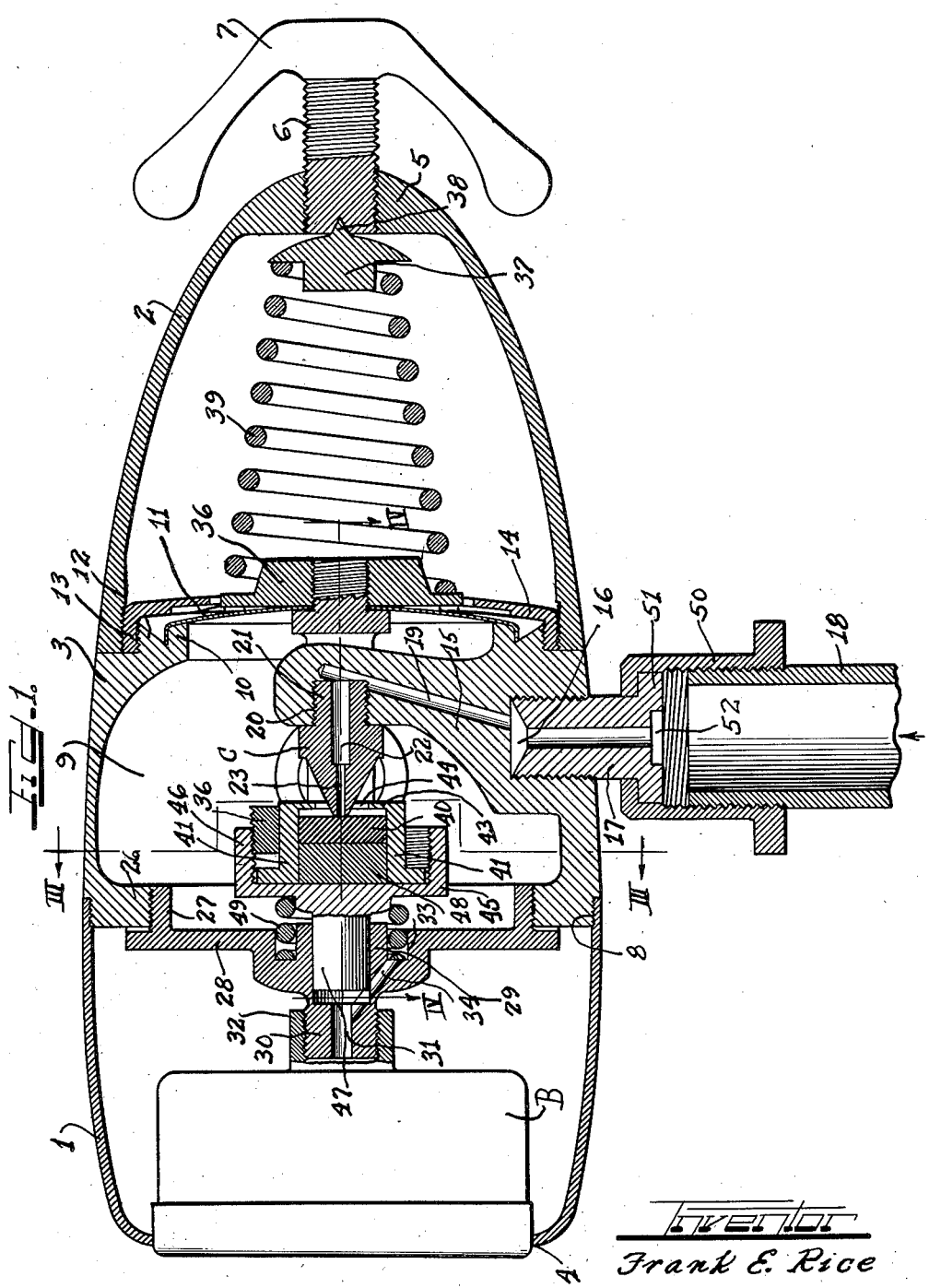
Inventor
Frank E. Rice
by Charles O'Neill Attys.

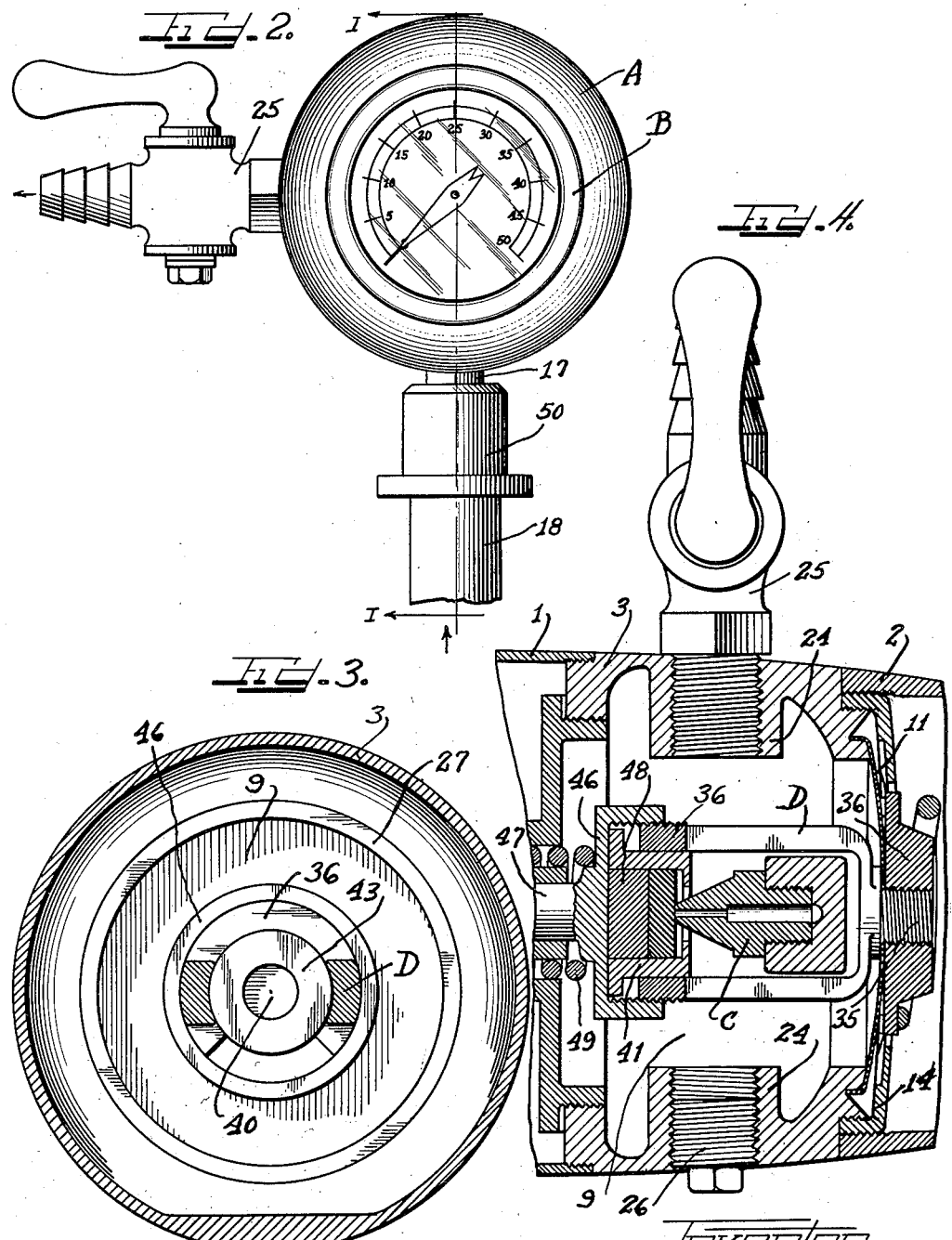

Patented Feb. 9, 1937

2,070,068

UNITED STATES PATENT OFFICE 2,070,068

REGULATOR MECHANISM

Frank E. Rice, Detroit, Mich., assignor to American Tap Bush Company, Detroit, Mich., a corporation of Delaware Application September 18, 1935, Serial No. 41,053

2 Claims. (Cl. 50—23)

The present invention relates to regulator mechanism and more particularly to mechanism applicable to beer dispensing arrangements for regulating pressure in beer barrels, without fluctuation, regardless of the amount of beer drawn from the barrels.

Beer, dispensed at bars, is usually dispensed directly from the barrels, through faucets on the bars, the beer being delivered to the faucets through suitable pipes, by fluid pressure within the barrels.

For creating sufficient fluid pressure in the beer barrels to force the contents thereof upwardly to and out of the dispensing faucets, fluid under pressure is supplied to the barrels, when set up ready for use. The fluid pressure may be air, which pressure is created by electric or hydraulic pumps, or may comprise carbonic acid gas.

In the event of use of carbonic acid gas, the gas is supplied in steel bottles, usually with a pressure of 750 pounds, and the bottles suitably connected through regulators, to the barrels, for reducing the pressure, as the pressure required in the beer barrels is much lower than the pressure of the gas in the bottles, say in the neighborhood of approximately 20 pounds.

A regulator, suitable for such purpose must be one where the pressure of approximately 20 pounds is maintained, constantly, in the barrels, without fluctuation, regardless of the quantity of beer drawn from the barrels.

While, there are at the present time, on the market, regulators for the accomplishment of this purpose yet the mechanism of the present invention constitutes an improvement over the present type of regulators.

The mechanism of the present invention utilizes a single housing or casing, containing a pressure gauge and a regulator mechanism, so that the structure as a whole is enhanced as to appearance and corners are eliminated thus doing away with unsightly appearance and elimination of places for the accumulation of dirt and the like.

It is an object of the present invention to provide a fluid pressure regulator, including a pressure gauge and a regulator mechanism, housed in a unitary casing.

Another object of the present invention contemplates a pressure regulator wherein a single conical spring is utilized for controlling movement of a vibratory membrane which in turn controls admission of fluid under high pressure into the expansion chamber of the regulator.

A further object of the present invention is to provide a fluid pressure regulator mechanism wherein a conical spring is utilized for taking care of both high and low pressures present in the regulator mechanism.

A still further object of the present invention is to provide, in a fluid pressure regulator, a movable seat member for controlling inlet into an expansion chamber, which seat member is guided in its movements made responsively to pressure conditions present in the expansion chamber.

A still further object of the present invention is to provide a seat member for an inlet nozzle, in a fluid pressure regulator, which seat member is of hard rubber, or other similar material, and so fashioned and mounted, as to form its own seat with the nozzle when moved against the nozzle, for closing fluid entry into an expansion chamber of a regulator.

The invention has for the further object the provision of an enclosing casing, for a pressure gauge and fluid pressure regulator, which is made in several parts, for convenience, and readily assembled to provide a unitary structure, to enhance the appearance of the structure, and to eliminate any opportunity of presenting dust collecting areas on the structure.

The above, other and further objects of the present invention will be apparent from the following description and accompanying drawings.

The accompanying drawings illustrate an embodiment of the present invention, and the views thereof are as follows:

Figure 1 is a longitudinal sectional view through a regulator mechanism of the present invention, and showing the seat member against the end of the inlet nozzle to close the expansion chamber to fluid admission.

Figure 2 is an end elevational view of the regulator mechanism of the present invention, looking at the left hand end of the mechanism of Figure 1.

Figure 3 is a sectional view taken substantially in the plane indicated by the line III—III of Figure 1, and Figure 4 is a fragmental sectional view taken substantially in the plane indicated by line IV—IV of Figure 1.

The drawings will now be explained.

The regulator mechanism of the form herein illustrated, comprises a casing, designated generally at A, and is shown as consisting of three parts, a front section 1, a rear section 2, and an intermediate section 3. It is to be understood, of course, that the casing A might be made of more than three sections, or of less, as engineering and manufacturing conditions warrant.

The casing A, is illustrated, as an ovoid, in elevation, with the front end of the front section 1, provided with a circular aperture 4, to receive a pressure gauge, designated generally at B, in the opening, with the dial thereof, as illustrated in Figure 2, arranged to be easily visible.

The rear section 2 has its rear end thickened as at 5, which end is bored and threaded to receive the threaded shank 6 of an adjusting nut 7.

The intermediate or mid-section 3 has, at its front end, a recessed shoulder 8 which is threaded to receive internal threads on the front section 1, for connecting the sections 1 and 3 together in assembled relationship.

The intermediate or mid-section 3 is constructed to provide an expansion chamber 9.

The sections 1 and 2, are made as shells, preferably spun, or otherwise shaped from flat stock. The intermediate or mid-section 3 is preferably cast metal.

The intermediate or mid-section 3 is fashioned with an annular flange 10, at its rear end, to which is soldered or otherwise secured a flexible membrane, such as a diaphragm, 11. The margins of the membrane 11 are formed over the flange 10 and secured thereto in gas-tight relationship.

The mid-section 3 is formed with another flange 12, outwardly of the flange 10, which is threaded for receiving internal threads on the interior of a flange 13 of a diaphragm shield 14. The exterior of the flange 13 is threaded for receiving in threaded engagement the adjacent end of the rear section 2, when the parts are assembled, as illustrated in Figure 1.

Formed as an integral part of the mid-section 3, is an upstanding neck 15 having, a threaded counter-bore 16 to receive a threaded nipple 17 of a pipe-connection for connecting a fluid supply pipe 18 to the regulator mechanism. The neck 15 is bored at 19 to force fluid passage from the bore 16 upwardly through the neck. The neck is provided with a horizontally extending threaded bore 20 for receiving the threaded reduced end 21 of a nozzle C. The nozzle C has a bore 22 extending from its inner end, where it communicates with the bore 19 of the neck and which bore 22 in turn communicates with a smaller bore 23 opening through the extremity of the nozzle, which extremity is preferably tapered for a purpose to be later explained.

The arrangement of the neck 15 and the nozzle C, is such, that the fluid admitted to the expansion chamber 9, from the nozzle, enters horizontally. The parts just described constitute inlet means whereby fluid under pressure is admitted to the expansion chamber 9.

In order to provide outlet means from the expansion chamber 9, the intermediate or mid-section 3 is provided with oppositely disposed threaded bosses 24 in either or both of which may be inserted a cock or cocks 25. When a cock 25 is inserted in one of the bosses 24, the other boss 24 may be closed by a threaded plug 26.

The provision of the two bosses 24 is so that left-hand or right-hand outlet connection may be made from the expansion chamber 9.

The front of the intermediate or mid-section 3 comprises an annular wall 26, of substantial diameter. The periphery of this wall is threaded to receive the threaded flange 27 of a cover plate 28.

The cover plate 28 is formed to provide a central cylindrical bearing portion 29, and an extended nipple 30 which is bored at 31, and which is in threaded engagement with an interiorly threaded neck 32 of the pressure gauge B. Formed in the cover plate 28 is an annular recess 33, from which a bore 34 leads to communicate with the bore 31 of the nipple 30, to thereby establish fluid passage from the chamber side of the cover plate to the pressure gauge B.

A yoke D is at one end provided with a threaded member 35 and at the other end of its length with an end which is a sector 36, threaded on its exterior. In assembling the yoke D with the diaphragm or vibratory membrane 11, the threaded end member 35 is passed through a central opening in the diaphragm and soldered or otherwise secured to the diaphragm and is threaded into a spring base member 36. And thuswise the yoke D is firmly attached to the diaphragm 11 for vibration therewith in accordance with pressure conditions existing in the expansion chamber 9.

A spring guide 37 having a point 38 for entering a tapered recess in the end of the threaded shank 6 of the adjusting screw 7, is engaged by the smaller end of a conical spring 39, the larger end of which engages against the spring base 36.

The seat member 40 is a circular disc of rubber or other suitable composition, preferably hard rubber, and is supported within a seat holder 41. The seat holder 41 is fashioned as a cup with an annular flange 42 at one end of the cup body and an inner annular flange 43 at the other end of the cup body, defining an aperture 44 into which projects the tip of the nozzle C. The seat holder 41 is retained in operative relationship with the yoke D by means of a jam nut 45. The jam nut 45 has a flange 46 which is interiorly threaded for engagement with the segmental end 36 of the yoke D. The jam nut 45 has extending from its surface opposite to that of the flange 46, a cylindrical stud 47 constituting a pilot which is entered in the cylindrical recess of the cover plate 28, thus serving as a guide for the yoke D, and its supported seat member 40. A filler block 48 is interposed between the seat member 40 and the adjacent face of the jam nut 45, as may be observed in Figures 1 and 4.

Within the annular recess 33 of the cover plate 28 is a spring 49 which engages the adjacent face of the jam nut 45, and whose purpose is to force the seat member 40 against the extremity of the nozzle C when the spring 39 is released.

Referring to the connection of the fluid supply pipe 18 to the regulator mechanism, the pipe 18 is in threaded engagement with a square nut 50 which is flanged over the T-head 51 of the tail pipe 17. The head 51 is bored at 52 to receive a strainer, preferably of 200-mesh screening, to prevent the entrance of foreign matter into the regulator.

The diaphragm or vibratory membrane 11, is preferably of thin metal, although other material, suitable for the purpose, might be utilized if desired. The provision of the diaphragm shield 14 is to prevent breakage or undue flexing of the diaphragm in the event excessively high pressure should occur in the expansion chamber 9.

The assembly of the mechanism illustrated in the drawings is as follows:

First of all the nozzle C is installed in the neck 15.

Next the vibratory membrane or diaphragm 11 is soldered to the shoulder 10 of the mid-section 3, and the diaphragm shield 14 screwed onto the flange 12 of the mid-section 3. The spring 39, spring guide 37 are then assembled, and the yoke D is attached to the diaphragm 11 and spring seat member 36. The rear section 2 is screwed to the mid-section 3. The adjusting screw 7 is then turned to compress the spring 39 to push the yoke D to its limit of movement in a direction away from the nozzle C. The seat holder 41, with the seat member 40 and the spacer block 48 press fitted is then applied to the yoke through the sector end thereof, and the jam nut 46 is then applied, enclosing the seat holder 41, and threaded onto the sector flange 36 of the yoke, thus assembling these parts in operative relation. Because of the tension applied to the spring 39 the seat member 40 is spaced from the tip of the nozzle C, and remains so spaced until the assemblage of the mechanism is completed.

Next the spring 49 is applied against the jam nut 46 and then the cover plate 28 is screwed into the front wall 26 of the mid-section 3, receiving the spring 49 in the annular recess 33 of the cover plate and also receiving the pilot 47 of the jam nut in the central recess of the cover plate. The cover plate is screwed tightly into the wall 26 of the mid-section 3, to effect a gas-tight joint. The pressure gauge B is then threaded onto the nipple 30 of the cover plate, and the front section 1 of the casing is then applied by being screwed to the mid-section 3.

The adjusting screw 7 is then rotated in a direction to release pressure on the spring 39, whereupon the seat member 40 is pressed against the tip of the nozzle D making its own seat in the seat member 40, so that thereafter, the seat area so formed is which repeatedly registers with the nozzle tip as the seat member is moved away from and against the nozzle, in service. The formation of the seat area in the seat member 40, in the manner stated, effectually seals the nozzle against any fluid admission to the expansion chamber 9, while the seat member 40 is against the nozzle, until the seat member 40 is moved away from the nozzle, by influence of the spring 39 overcoming a slight reduction in pressure within the expansion chamber 9, below that for which the action of the spring 39 is set by adjustment of the screw 7.

Thereafter the tail pipe 17 is applied to the mid-section 3, and the square nut 50 with it, ready to be attached to a supply pipe 18 for use.

The operation of the mechanism is as follows:

The regulator mechanism having been connected in a pipe line, such as that between a carbonic acid gas bottle and a beer barrel, with the adjusting screw 7 manipulated to so compress the spring 39 as to yield when any predetermined pressure is present in the expansion chamber 9, which is the pressure of the fluid admitted to the beer barrel. The adjustment of the screw 7 may be made by admitting the fluid under high pressure to expansion chamber 9, and observing the pressure appearing on the pressure gauge B. The screw is adjusted until the desired pressure within the expansion chamber 9 is secured.

The gas, or other fluid, under high pressure, presses against the seat member 40, and tends to urge it away from the tip of the nozzle. Thus fluid under pressure is admitted to the expansion chamber 9, where the pressure drops, because of expansion of the fluid, and urges or tends to urge the diaphragm 11 to the right, as viewed in Figures 1 and 4, thus moving the seat member 40 toward the nozzle B. If this pressure in the chamber 9 is above that for which the spring 39 is set, then the seat member 40 will close against the nozzle tip shutting off further fluid admission to the chamber 9, until the pressure therein drops. As the pressure in the chamber 9 drops, to the point determined by the setting of the spring 39, that is the pressure no longer resists the action of the spring 39, the spring 39 will then move the yoke and its supported seat member 40 away from the nozzle thus admitting more fluid under pressure to the expansion chamber.

This operation is practically carried out as long as the fluid line is in use.

In practice the seat member 40 will flutter with respect to the tip of the nozzle, opening and closing the nozzle intermittently and at high frequency, to maintain, within the expansion chamber 9, a uniform fluid pressure.

Because of the difference in pressure between the fluid at the inlet and the fluid at the outlet, the mechanism responds rapidly and maintains a uniform desired pressure within the expansion chamber 9. The adjustment of the spring 39 may be made so as to determine the pressure within the expansion chamber 9, and thus the pressure of fluid passing from the mechanism to the place of use, such as a beer barrel.

The formation of the spring 39, as a coiled spring of non-uniform diameter, permits the use of but a single spring for resisting action of the diaphragm 11. The coils of larger diameter are compressed slightly, by pressure conditions in the expansion chamber 9 lower than the pressure necessary to compress the smaller coils of the spring. In the event of excessive pressure within the expansion chamber 9, then the larger and smaller coils would act with compound action to resist movement of the diaphragm to the right, as viewed in Figures 1 and 4.

Normally the vibration of the membrane or diaphragm 11 is nicely maintained by adjustment of the spring 39.

The regulator mechanism of the present invention is especially adapted for installations requiring a continuous and unusually large amount of gas, as it is possible to secure uniform gas pressure at the outlet with the regulator mechanism of the present invention.

Figure 2 shows the regulator as it appears when arranged with the inlet vertical. If it is desired to connect the regulator with the inlet horizontal, then the gauge B would be rotated 90° in the casing, to present its face in proper position for ready observation, which is possible, as the gauge is not fixed in the casing to an extent to preclude such adjustment.

The diaphragm shield 14 is used to prevent undue distortion of the diaphragm in the event of abnormal pressure in the expansion chamber 9.

The invention has been described herein more or less precisely as to details, yet it is to be understood that the invention is not to be limited thereby, as changes may be made in the arrangement and proportion of parts, and equivalents may be substituted, without departing from the spirit and scope of the invention.

The invention is claimed as follows:

1. A fluid pressure regulator comprising a casing open at both ends, a diaphragm closing one end of said casing, a cover plate closing the other end of said casing, a nut having a central recess and having an extension slidably guided in a central aperture formed in said cover plate, a valve seat entered in the recess in said nut, a seat holder entered in said nut to retain said seat in operative position, a yoke carried by said diaphragm and having a portion threaded in said nut and in jamming engagement with said seat holder, said cover plate being provided with an annular recess, a compression spring seated in said recess, said nut being seated on said spring and having its extension within said spring, a ported member in said casing in aligned relation to and above the valve seat, and compression spring means engaging said diaphragm.

2. A pressure regulator mechanism comprising an intermediate casing open at both ends, a diaphragm made integral with said casing to close one end of said casing, a diaphragm shield threaded on said intermediate casing and overlying a portion of said diaphragm in spaced relation thereto, a spring housing threaded on said diaphragm shield, a spring in said housing in operative connection with said housing and said diaphragm, a closure cap threaded in the other end of said intermediate casing, a pressure gauge carried by said cap, an apertured gauge housing threaded on said intermediate casing with said gauge entered in the aperture, air inlet means on said intermediate casing, and valve means cooperable with said inlet means carried by said diaphragm and guided by said closure cap positioned within said intermediate casing.

FRANK E. RICE.